US010496565B2

(12) United States Patent
Enamandram et al.

(10) Patent No.: US 10,496,565 B2
(45) Date of Patent: Dec. 3, 2019

(54) MICRO-ARCHITECTURAL TECHNIQUES TO MINIMIZE COMPANION DIE FIRMWARE LOADING TIMES IN A SERVER PLATFORM

(71) Applicant: Intel Corporation, Santa Clara, CA (US)

(72) Inventors: Anand K. Enamandram, Folsom, CA (US); Sivakumar Radhakrishnan, Portland, OR (US); Jayasekhar Tholiyil, Portland, OR (US); Tina C. Zhong, Portland, OR (US); Malay Trivedi, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/049,607

(22) Filed: Jul. 30, 2018

(65) Prior Publication Data

US 2019/0042514 A1    Feb. 7, 2019

(51) Int. Cl.
| | |
|---|---|
| *G06F 13/16* | (2006.01) |
| *G06F 13/40* | (2006.01) |
| *G06F 9/4401* | (2018.01) |
| *G06F 13/42* | (2006.01) |
| *G06F 9/445* | (2018.01) |

(52) U.S. Cl.
CPC ........ *G06F 13/1663* (2013.01); *G06F 9/4405* (2013.01); *G06F 9/445* (2013.01); *G06F 13/1668* (2013.01); *G06F 13/4027* (2013.01); *G06F 13/4282* (2013.01)

(58) Field of Classification Search
CPC .......... G06F 13/10; G06F 13/14; G06F 13/16; G06F 13/1652; G06F 13/1663; G06F 13/1668; G06F 13/4027; G06F 13/4282; G06F 9/4401; G06F 9/4403; G06F 9/4405; G06F 9/4411; G06F 9/445; G06F 3/123
See application file for complete search history.

(56) References Cited

U.S. PATENT DOCUMENTS

| | | | | |
|---|---|---|---|---|
| 7,908,470 | B1* | 3/2011 | Cavanna | G06F 9/4405 711/1 |
| 2003/0106052 | A1* | 6/2003 | Morrison | G06F 8/65 717/170 |
| 2009/0172379 | A1* | 7/2009 | Rothman | G06F 8/456 713/2 |
| 2013/0151829 | A1* | 6/2013 | Amann | G06F 9/4401 713/2 |
| 2014/0331033 | A1* | 11/2014 | Liang | G06F 12/00 713/1 |
| 2017/0123779 | A1* | 5/2017 | Albot | G06F 12/109 |
| 2017/0126683 | A1* | 5/2017 | Bradbury | G06F 16/00 |
| 2018/0121357 | A1* | 5/2018 | Gou | G06F 12/0813 |
| 2018/0267842 | A1* | 9/2018 | Gou | G06F 9/528 |

* cited by examiner

*Primary Examiner* — Thomas J Cleary
(74) *Attorney, Agent, or Firm* — Compass IP Law, PC

(57) ABSTRACT

Examples include an apparatus having a communications link bridge coupled to a plurality of processors to control connections between each of the plurality of processors and the apparatus; and a controller coupled to a memory over a memory interface to control access to the memory, the controller configured to, during system initialization, selectively bypass a token requirement for access to the memory for read requests by processors and allow multiple processors to read the memory concurrently.

18 Claims, 6 Drawing Sheets

MICRO-ARCHITECTURAL TECHNIQUES TO MINIMIZE COMPANION DIE FIRMWARE LOADING TIMES IN A SERVER PLATFORM

TECHNICAL FIELD

Examples described herein are generally related to minimizing firmware loading times in a server.

BACKGROUND

With a wide variety of workloads emerging for cloud servers such as batch processing, real time analytics, high performance databases, etc., it becomes necessary to accelerate commonly used kernels using custom hardware/silicon intellectual property (IP) blocks inside the computing system. To preserve modularity and reduce time to market (TTM), these custom accelerator IP blocks are typically integrated with the main central processing unit (CPU) die in the form of a multi-chip package as companion dies (CDs). These CDs execute firmware that is required to be loaded at system boot time in order to function correctly. Firmware images for such companion dies are typically stored in a shared platform resource—such as a flash storage device attached to the chipset and loaded at boot time. The cloud server business demands optimal provisioning techniques for computer, storage and networking services with an emphasis on higher performance and low total cost of ownership (TCO). Increased boot times in a cloud server computing platform due to large firmware loading times are detrimental and sometimes prohibitively expensive for real time provisioning.

Consider a general case of an 8-socket server with two instances of a CD attached to each CPU. There is a total of 16 CD instances in this configuration. Each of these 16 CD instances require firmware to be loaded at boot time. The 16 total CD instances need access to its firmware in a concurrent manner during the platform boot flow. This leads to contention at the interface to the flash storage device among various agents (e.g., CDs) concurrently trying to access the same platform resource (i.e., flash memory storage behind a chipset interface), thereby causing a bottleneck, resulting in slow boot times that do not meet the boot time requirements for the computing platform. This problem gets worse as the number of CPUs and CDs in the system is increased for higher performance computing platforms.

Two approaches may be used to attempt to overcome this problem. In a first approach, a separate interface to the shared flash storage device is added to each CD socket. However, this results in an increased silicon area for the CDs, and additional pinouts to the motherboard. This approach is expensive, increases the bill of materials (BOM) cost of the system, and does not provide the desired performance. In a second approach, a small read only memory (ROM) is added to the system for each CD and made accessible to the CD to store the CD's firmware image. Thus, each instance of a CD has its own ROM. This is impractical in that it results in multiple copies of the firmware stored in the system (one each per ROM). This approach also increases the BOM cost, silicon area, and power requirements. Neither of these approaches are workable solutions.

DETAILED DESCRIPTION

As contemplated in the present disclosure, embodiments of the present invention comprise a multi-socket computing system with a platform controller hub (PCH) that is configured to optimize the loading times of firmware images to companion dies (CDs) in the system. This optimization results in adequate boot times for the system even as the number of CPUs and CDs goes up.

Embodiments include a micro-architecture that provides a cost-effective, highly scalable and flexible solution within a system on a chip (SOC) that overcomes the deficiencies of previous approaches and provides improvements in area, cost, power, performance and scalability. Embodiments include an efficient serial peripheral interface (SPI) controller design having a restreaming arbiter state machine to provide a high bandwidth restreaming interface for loading basic input/output system (BIOS) and firmware (FW) images. Embodiments also include an optimized router design for a communications link interface for arbitrating FW requests and an optimal placement for timing and synthesis within the SOC for area optimization. Finally, embodiments include usage of a dynamic reprogramming feature of a communications link bridge component in the context of CD FW loading and a load balanced router network for uniform socket access. As a result, embodiments of the present invention provide higher performance, better scalability, lower cost of implementation, and a reduced BOM cost than previous approaches.

Figure 1:
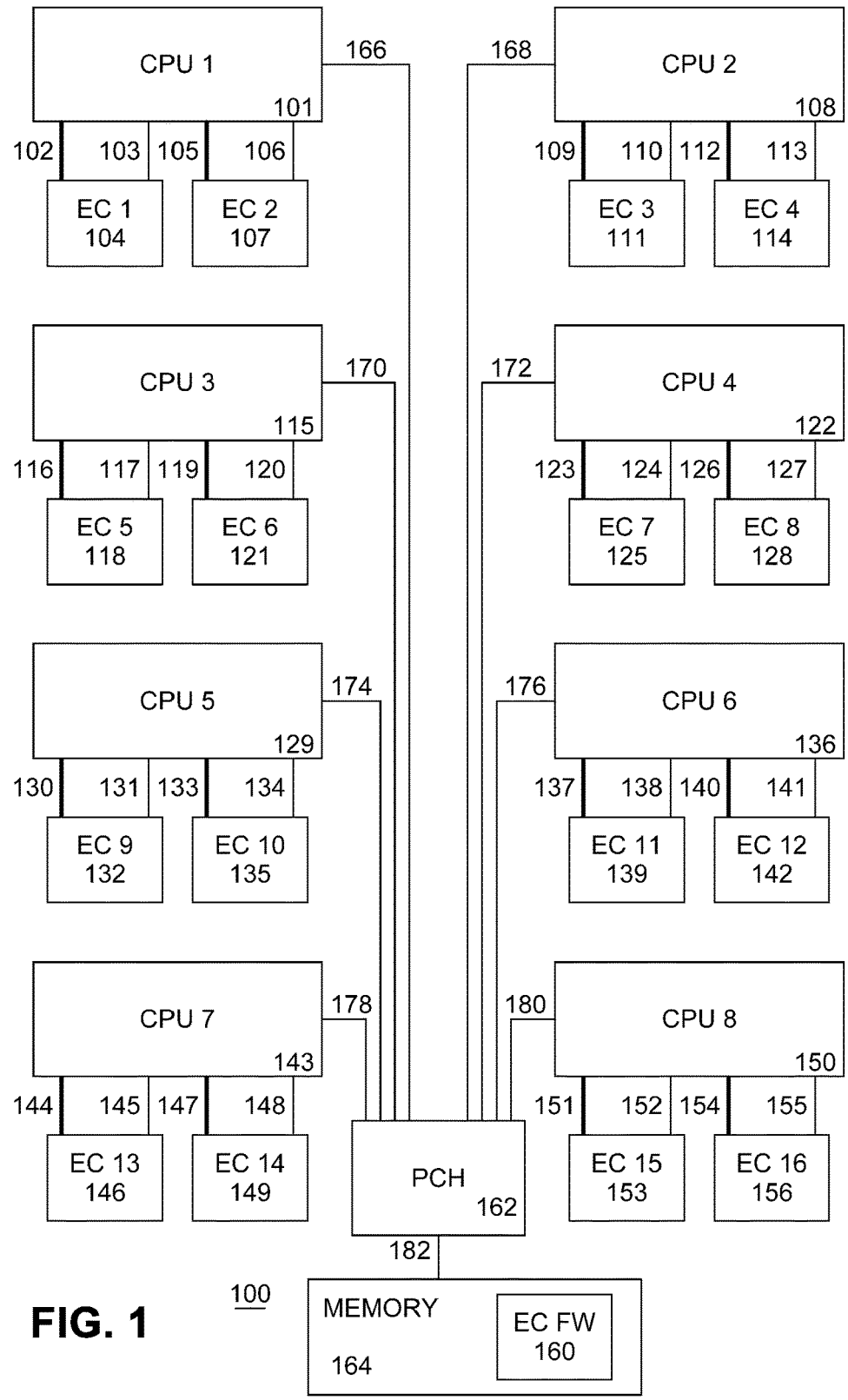
FIG. 1 illustrates an example computer server architecture.

FIG. 1 illustrates an example computer server architecture 100. This example shows eight CPUs—CPU 1 101, CPU 2 108, CPU 3 115, CPU 4 122, CPU 5 129, CPU 6 136, CPU 7 143, and CPU 8 150, all coupled to PCH 162. In other examples, there may be other numbers of CPUs in the system, such as two, four, 16, 32, 64, and so on, depending on the desired processing workloads of the system. Herein, the term CPU and processor are used interchangeably. In this example, each CPU is coupled to two CDs such as multi-gigabit Ethernet controllers (ECs), with each CD being coupled to a CPU by a performance interconnect and an out of band (OOB) communications link. In other examples, there may be other numbers of CDs coupled to each CPU, such as one, four, eight, and so on. In other examples, the CDs may perform functions other than Ethernet networking functions. Thus, CPU 1 101 is coupled to EC 1 104 over performance interconnect 102 and OOB communications link 103 and is coupled to EC 2 107 over performance interconnect 105 and OOB communications link 106. In an embodiment, each set of CPU and associated CDs (ECs in this example) are resident in a multichip package (MCP) for maximizing I/O connectivity and providing advanced networking capabilities for servers.

Performance interconnects 102 and 105 are used to communicate data from EC 1 104 and EC 2 107, respectively, to and from CPU 1 101. In one embodiment, performance interconnects comprise an on-package interconnect (OPI). In one embodiment, Ethernet controllers EC 1 104 and EC 2 107 are coupled to other network devices (not shown in FIG. 1) to send and receive data between the other network devices (which may in turn be coupled to networks such as the Internet, wide area networks (WANs), or local area networks (LANs)), and CPU 1 101. CPU 1 101 then processes the data as needed. OOB communication links 103 and 106 are used by CPU 1 101 to control the operation of EC 1 104 and EC 2 107, respectively. In an embodiment, the communication rate and bandwidth of the performance interconnect is greater than that of the OOB communications link. In one embodiment, performance interconnects 102 and 105 are high-speed interfaces known as R-LINKs, and OOB communication links 103 and 106 are "sideband" ("SB") lower speed interfaces known as SB R-LINKs. In an embodiment, the speed of the R-LINK is in the multiple gigabit per second range and the speed of the SB R-LINK is approximately 25 megabits per sec (Mb/s).

CPU 1 101 is also coupled over OOB communications link 166 to PCH 162 to interface to other components in computing system 100. PCH 162 comprises circuitry (often called a "chipset") that controls certain data paths and support functions of processors in a computing system. In one capability as shown in FIG. 1, PCH 162 provides access to memory 164 over interface 182. In an embodiment, memory 164 is a flash memory device and interface 182 is a serial peripheral interface (SPI). In another capability, PCH 162 provides access to CPU 1 over a data link (not shown), to transfer data between storage devices (such as memory 164, or other memories) coupled to the PCH and CPU 1 101.

In similar fashion, system 100 includes additional CPUs and CDs, such as CPU 2 108 interfacing to EC 3 111 over performance interconnect 109 and OOB communications link 110, to EC 4 114 over performance interconnect 112 and OOB communications link 113, and to PCH 162 over OOB communication link 168; CPU 3 115 interfacing to EC 5 118 over performance interconnect 116 and OOB communications link 117, to EC 6 121 over performance interconnect 119 and OOB communications link 121 and to PCH 162 over OOB communication link 170; CPU 4 122 interfacing to EC 7 125 over performance interconnect 123 and OOB communications 124, to EC 8 128 over performance interconnect 126 and OOB communications link 127, and to PCH 162 over OOB communication link 172; CPU 5 129 interfacing to EC 9 132 over performance interconnect 130 and OOB communications link 131, to EC 10 135 over performance interconnect 133 and OOB communications link 134, and to PCH 162 over OOB communication link 174; CPU 6 136 interfacing to EC 11 139 over performance interconnect 137 and OOB communications link 138, to EC 12 142 over performance interconnect 140 and OOB communications link 141, and to PCH 162 over OOB communication link 176; CPU 7 143 interfacing to EC 13 146 over performance interconnect 144 and OOB communications link 145, to EC 14 149 over performance interconnect 147 and OOB communications link 148, and to PCH 162 over OOB communication link 178; and CPU 8 150 interfacing to EC 15 153 over performance interconnect 151 and OOB communications link 152, to EC 16 156 over performance interconnect 154 and OOB communications link 155, and to PCH 162 over OOB communication link 180. Each of the CPUs can access storage devices coupled to the PCH over data lines (not shown).

Memory 164 stores at least one firmware image to be loaded into a CD (such as an Ethernet controller) during system initialization (i.e., boot) time. In one example, an Ethernet controller (EC) firmware (FW) image 160 is stored in memory 164. At boot time, each CPU reads EC FW 160 from memory 164 over a data line (not shown) and loads the EC FW into the CPU's associated ECs. Once an EC has the EC FW image stored within the EC, the EC can begin executing the EC FW and become operational. The EC FW image must be available prior to peripheral component interface (PCI) enumeration processing during system initialization.

As will be apparent from analysis of the architecture shown in FIG. 1, this will result in each one of the eight CPUs separately accessing memory 164 to get a copy of EC FW 160. Each CPU then loads the EC FW into the associated ECs. For example, CPU 1 101 gets a copy of EC FW 160 by using OOB communication link 166 and loads the EC FW over performance interconnect 102 to EC 1 104, and over performance interconnect 105 to EC 2 107, and so on. One problem imposed by the configuration of FIG. 1 is that the EC FW access made by each EC during boot time leads to a performance bottleneck within the PCH, since they typically would be serialized with respect to each other. Consequently, the read latency of the EC FW increases to a point that it becomes untenable for the basic input/output system (BIOS) and EC FW to boot within desired system startup requirements. This is further exacerbated by the fact that the ECs have to send requests through the CPU's OOB communication link to the PCH since the EC FW image for each EC is needed before a bootstrap processor performs enumeration of I/O devices for the system.

Embodiments of the present invention overcome these limitations. In the communications protocol for managing the OOB communication links 202, all source agents interacting over OOB communication links must follow a token-based protocol to get a token from the target agent before sending the transaction (e.g., a read/write request) to it. The agent which is granted the token has indivisible and exclusive access to the target until the token is released by the requestor. Only a single token is allowed at a time amongst the competing agents. This requirement is needed to avoid potential deadlocks, to prevent violation of read/write ordering and to simplify the buffering and arbitration requirements amongst the agents. This requirement results in a completely serialized process for the EC FW 160 image access. However, in the EC FW 160 load case there is no code modification or conflict of data between the competing agents, and so read tokens are not required per se and can be eliminated as long as the transaction is a read only request to fetch EC FW 160.

Figure 2:
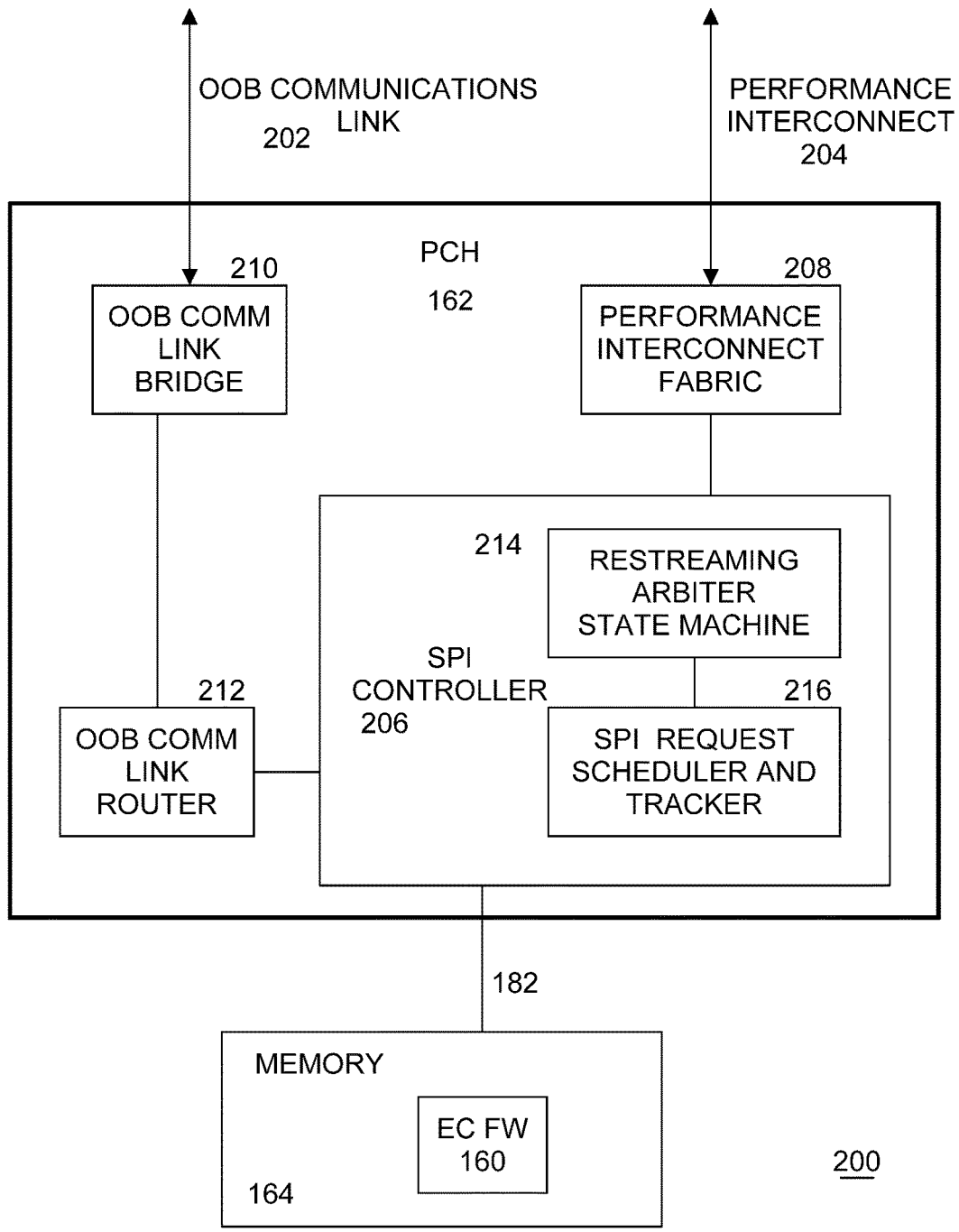
FIG. 2 illustrates an example of a platform controller hub.

FIG. 2 illustrates an example of a platform controller hub (PCH). In PCH 162, in this example an OOB communication (comm) link bridge 210 component is designed to support eight sockets (one per CPU) with 16 Port IDs to allow two CDs per socket (each CD has an associated Port ID). In other examples, other numbers of sockets and CDs per socket may be used. OOB communication link bridge 210 provides control of connections between the CPUs and the PCH. An OOB communication link router 212 component interconnects OOB communication link bridge 210 with SPI controller 214 to route CPU access to memory 164. Only one router is shown in FIG. 2, but in other embodiments multiple routers may be used. In one embodiment, the number of routers is 16. Performance interconnect fabric 208 couples performance interconnects 204 from CPUs to SPI controller 214. Data read from memory 164 (such as EC FW 160) is transferred by SPI controller 206 over OOB communications link 202 to a requesting agent (e.g., CPU).

SPI controller 206 includes SPI request scheduler and tracker 216 component to manage access to the memory over SPI 182. SPI controller 206 includes a restreaming arbiter state machine 214 for controlling EC FW 160 image accesses. In embodiments of the present invention, the SPI controller is configured specifically for the EC FW instances based on the Port ID parameter or straps (e.g., input pins on a design block tied to "0" or "1" values) during design/ register transfer level (RTL) compile time, such that SPI controller 214 selectively bypasses the token requirement/ SPI locking behavior based at least in part on the Port ID of the request from OOB communication link 202 for read requests and allows multiple agents to read EC FW 160 concurrently. In an embodiment, the read request is to obtain a portion of a firmware image for the companion die (e.g., FW for the EC). Hence the optimization of allowing token-less reads only applies to the EC reads to FW regions in SPI flash memory 164, while the rest of the intellectual property blocks (IPs) or agents in the SoC will adhere to the normal control link protocol using tokens. This smart optimization of selective tokenless reads increases performance of EC FW loads and thereby decreases overall system boot time.

The security attributes of the source agents are checked with the Port ID as an authentication step. In an embodiment, SPI controller 214 allows full restreaming of the incoming requests from up to 16 agents across the SPI flash memory interface 182 at the maximum line rate as opposed to a solution implementing a store and forward, 100% sequential processing of requests. This provides a security advantage for CDs that can gain extra performance from the optimization compared to an external network interface card (NIC) connected to one of the Peripheral Component Interconnect Express (PCIe) Root Ports in computing system 100.

SPI controller 206 performs arbitration amongst the source agents multiplexing across both performance interconnect 204 and OOB communications link 202, apportioning bandwidth fairly based on memory access requests. The base scheme is round robin with the provision to have a weighted arbitration for better bandwidth allocation for the EC agents as needed. SPI controller 206 implements full read pipelining from OOB communications links, which significantly reduces the read latency.

OOB communication bridge 210 allows general purpose message flows between PCH 162 and a CPU. The OOB communication link bridge provides an isolation between PCH 162 and the OOB communication links 202 of the CPUs, thereby allowing independent assignment of Port IDs to either CD. If there was no isolation (or re-programming), then a CPU and the PCH would have to coordinate the use of Port IDs, which are limited in number in the OOB communication link protocol, due to a limited number of Port ID bits available. OOB communication link bridge 210 provides isolation of PCH and CPU OOB communication link networks, and also allows flexibility to re-map OOB communication link Port IDs on both sides. In an embodiment, OOB communication link bridge 210 is a point to point network. For each communications path there is an OOB communication link bridge on the CPU and the PCH side.

SPI requests from each EC will have the same Port ID as in all ECs in the system. The OOB communication link bridge in the CPU will make these requests unique based on the port it receives, while on the PCH side, OOB communication link bridge 210 identifies and makes unique the Port IDs based on the link instance that it receives. All EC instances use the same security attributes that the SPI interface 182 will authenticate and allow access to the EC FW 160 image. Thus, eight OOB communication links multiplied by two Port IDs per socket are mapped to the SPI flash memory 164 for FW image access.

In an embodiment, the OOB communication link bridge in the CPU and in PCH 162 are reprogrammed for multiple sets of routing IDs within the OOB communications link bridge 210. For example, if computing system 100 has four pairs of OOB communications links, the EC FW 160 can be loaded at a time for a given pair of OOB communications links. After the operation is completed, the computing system has to be quiesced for a short period of time and the Port IDs in OOB communication link router 212 need to be reprogrammed for a new pair of OOB communications links via FW (such as PCODE in the CPU and power management controller (PMC) FW in PCH 162). Reprogramming may consume less than a few milliseconds, however this provides significant benefits in terms of minimizing hardware complexity, die area and also scalability.

The OOB communication link bridge allows mapping Port IDs to allow 16 agents to send requests via only two OOB communication links. Reprogramming of OOB communication link bridges for multiple passes is allowed. This provides for 64 agents but requires less than two seconds with read streaming. Therefore, the solution is highly scalable.

Figure 3:
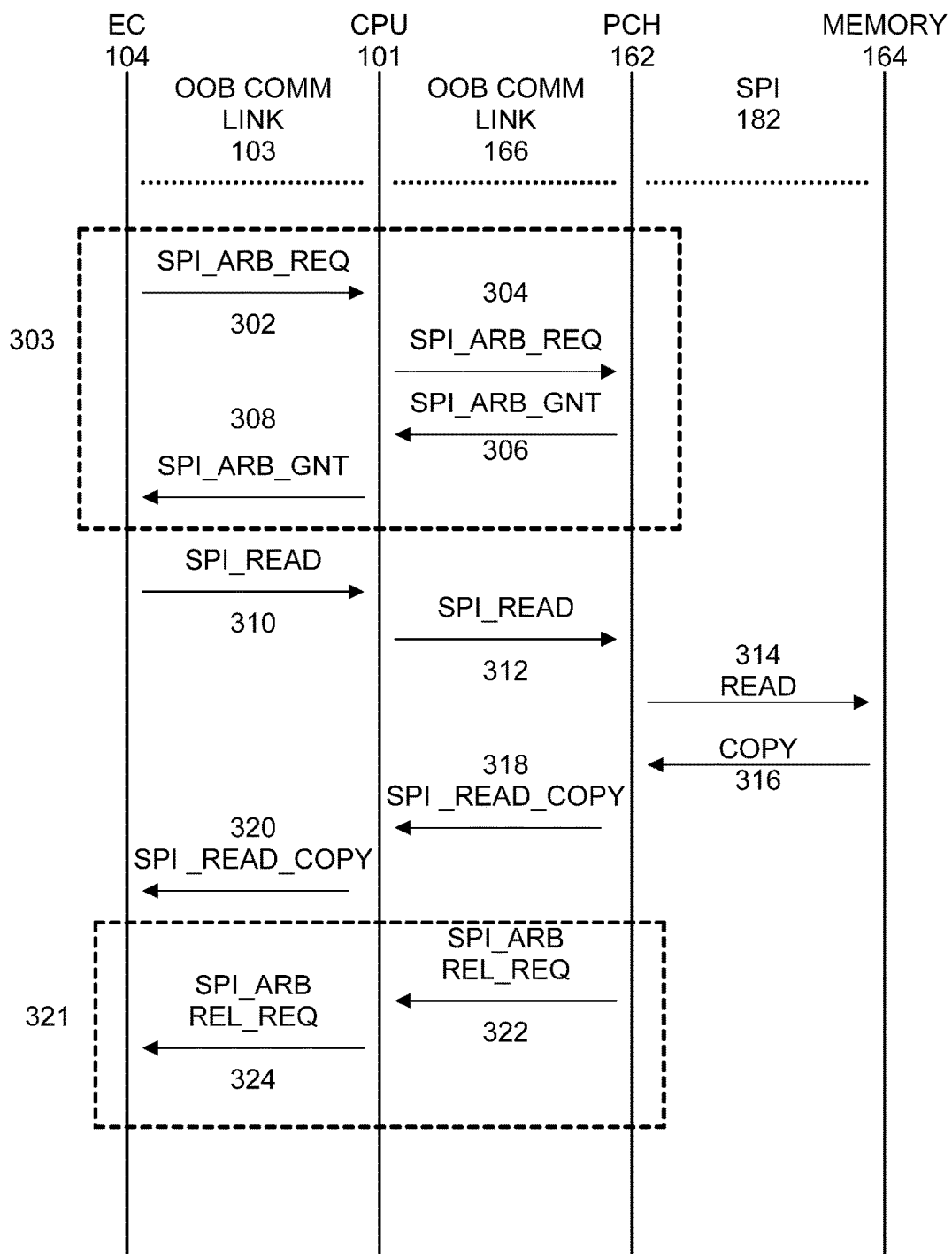
FIG. 3 illustrates an example of a communications diagram for minimizing firmware loading times.

As shown in FIG. 1, a CD (such as EC 1 104) is coupled to a CPU (such as CPU 1 101) over OOB communication link 103; the CPU is coupled to PCH 162 over OOB communication link 166; and PCH 162 is coupled to memory 164 over SPI 182. FIG. 3 illustrates an example of a communications diagram for minimizing firmware loading times. In a general case, for EC 1 104 to obtain a portion of EC FW 160 from memory 164, EC 1 must get control of the communications path to the memory. However, to speed up system boot times, during system initialization read requests are handled concurrently without requiring the requesting entity to get the token used to implement single access to the memory. In normal post-booting operations (i.e., not in system initialization mode), EC 1 104 sends a SPI arbitration request (SPI_ARB_REQ) signal 302 to CPU 1 101. CPU 1 101 then sends a SPI arbitration request signal 304 to PCH 162. Restreaming arbiter state machine 214 within SPI controller 206 of PCH 162 determines that the SPI arbitration request is to be granted without regard to the token if the PCH is in a system initialization mode. When the PCH is not in a system initialization mode, the token is used and access is granted only when the token is available for the requesting entity.

During normal post-booting operations, when the SPI arbitration request is granted, PCH sends a SPI arbitration granted (SPI_ARB_GNT) signal 306 back to CPU 1 101. CPU 1 101 sends a SPI arbitration granted signal 308 to requesting EC 1 104. However, in system initialization mode, these actions (as shown in box 303) are not needed and are omitted from EC FW loading operations.

Regardless of whether the system is initializing or not, EC 1 104 sends a SPI read request (SPI READ) signal 310 to CPU 1 101 to get data from memory 164. In an embodiment, the size of the data request in the read request is 64 bytes. In other embodiments, other sizes may be used. CPU 1 101 sends SPI read request signal 312 to PCH 162. SPI controller 206 within PCH 162 sends a read request signal 314 to memory 164. Memory 164 gets the requested data (e.g., 64 bytes in one embodiment) and forwards the data via a copy signal 316 back to PCH 162. In one embodiment, the data is sent as multi-double word (MDW) data chunks of 32 bits at a time. PCH 162 then sends a SPI read copy signal 318 to CPU 1 101. CPU 1 101 sends a SPI read copy signal 320 to the requesting EC 1 104. EC 1 104 now has the requested data and stores the data in internal storage within the EC for future processing. When the system is not in system initialization mode (and thus arbitration steps 302, 304, 306, and 308 have previously been performed), PCH 162 then sends a SPI arbitration release request signal 322 to CPU 1 101. CPU 1 101 sends a SPI arbitration release request signal 324 to the requesting EC 1 104 and processing for this data chunk complete. However, in system initialization mode, these actions (as shown in box 321) are not needed and are omitted from EC FW loading operations.

Similar processing is performed for subsequent requests by any EC and any CPU in system 100. Note that data is transferred only during the SPI_READ_COPY phase.

Figure 4:
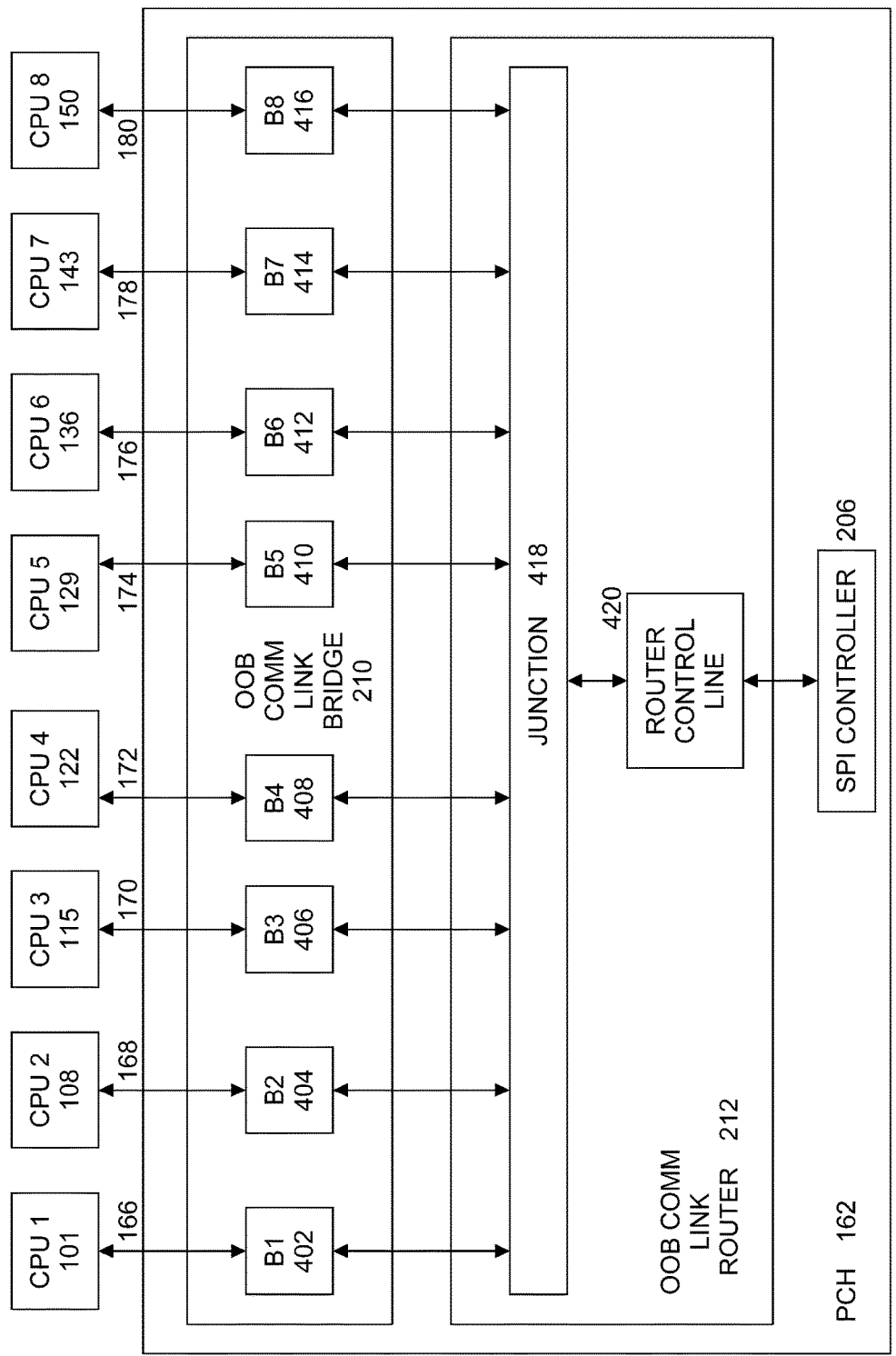
FIG. 4 illustrates another example of a platform controller hub.

FIG. 4 illustrates another example of a platform controller hub (PCH) 162. PCH 162 comprises OOB communication link bridge 210, which has a plurality of bridge components, one per CPU in the computing system. For example, OOB communication link bridge 210 includes bridge component 1 402 coupled to CPU 1 101 over OOB communication link 166, bridge component 2 404 coupled to CPU 2 108 over OOB communication link 168, bridge component 3 406 coupled to CPU 3 115 over OOB communication link 170, bridge component 4 408 coupled to CPU 4 122 over OOB communication link 172, bridge component 5 410 coupled to CPU 5 129 over OOB communication link 174, bridge component 6 412 coupled to CPU 6 136 over OOB communication link 176, bridge component 7 414 coupled to CPU 7 143 over OOB communication link 178, and bridge component 8 416 coupled to CPU 8 150 over OOB communication link 180. Although eight bridge components are shown in FIG. 4 because there are eight CPUs in this example, other numbers of bridge components may be used (matching the number of CPUs in the computing system).

OOB communication link router 212 includes a junction 418 to couple to all bridge components, such as bridge component 1 402, bridge component 2 404, bridge component 3 406, bridge component 4 408, bridge component 5 410, bridge component 6 412, bridge component 7 414, and bridge component 8 416. Junction 418 selects which one of the bridge components can connect to router control line 420 to communicate with SPI controller 214.

An IOSF OOB communication link has a limitation on the number of supported port IDs. A port ID is an 8-bit field which allows for only 256 port IDs. When using a connected OOB communication link network in the CPU and the PCH (connected via OOB comm link bridge 210), each endpoint should be able to communicate with all other endpoints. However, having only 256 port IDs available pose a limitation to support unique endpoints in two components. To overcome the port ID limitation, embodiments of the present invention use a scheme where only up to 16 endpoints in each die is addressable from the other die. In an example, port IDs 0x00-0xDF and 0xF0-0xFF are considered local to the given die, and port IDs 0xE0-0xEF are considered to be on the other die.

In both the CPU and the PCH, OOB communication link messages with destination port ID 0xE0-0xEF (in one example) are routed to the bridge end point (i.e., OOB communication link bridge 210) on each die. These messages then get transmitted over the bridge link to the other side.

Making all of the global endpoints fit in the 0xE0-0xEF range poses another complication to support legacy flows. To overcome these issues and to have full flexibility in assigning the local endpoint IDs within each chip, a port ID re-mapping scheme is used on the OOB comm link bridge endpoint. On the bridge receiver side, a port ID remapper is implemented that maps the incoming destination port IDs from 0xE0-0xEF range to any other port ID. Thus, the destination port IDs on the bridge will always be 0xE0-0xEF but can be mapped to any other port ID at the receiving side of the bridge. If the incoming transaction does not have a valid mapping, that transaction is dropped at the OOB comm link bridge.

The PCH OOB communication link will forward the FW read requests from each socket (up to 64 bytes each) to the SPI controller 206 for processing concurrently. More than one read request may be issued from a given OOB communication link requestor at a time. The SPI read requests coming from a CPU are random in nature. There is no arbitration provided at the CPU level to make sure that each of the sockets are getting serviced at regular intervals. The OOB communication link bridge needs to ensure that none of the sockets are starving or de-prioritized to access SPI 182 and provides proper load balancing. The implementation is done in such a way that the OOB communication link router paths from the OOB communication link bridge to the SPI controller are load balanced across all sockets. This means that transactions from OOB communication link bridge to SPI controller travel through the same levels of OB communication link router 212 logic. OOB communication link router 212 implements internal arbitration and so the method depends on a balanced network path and router arbitration to achieve better service to all sockets.

Figure 5:
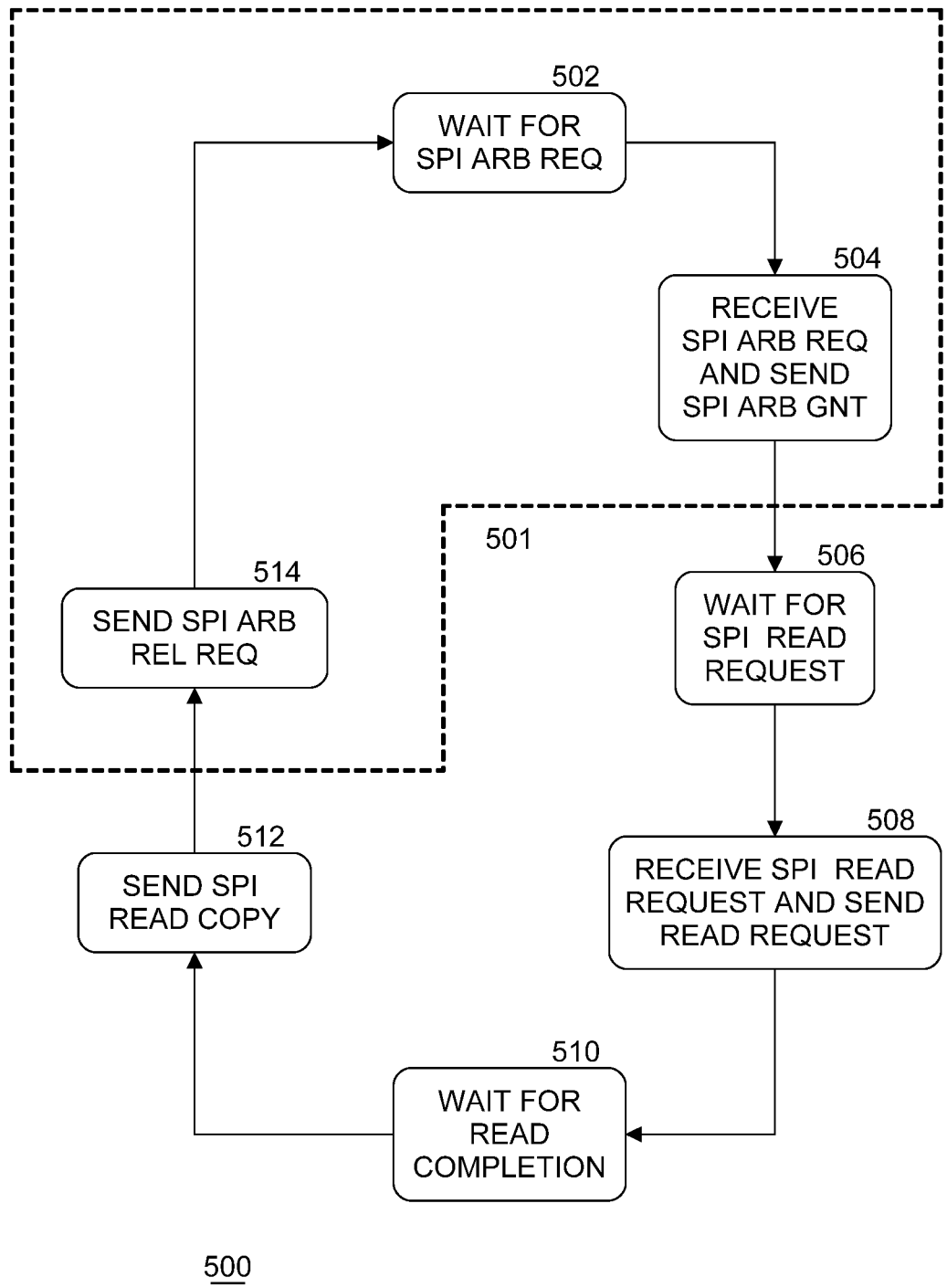
FIG. 5 illustrates an example diagram of a restreaming arbiter state machine.

FIG. 5 illustrates an example diagram of a restreaming arbiter state machine 214. During normal operations (i.e., not in system initialization mode), restreaming arbiter state machine 214 is in a wait state 502, waiting to receive a SPI arbitration request signal 304 from one of the CPUs in the system. When a SPI arbitration request signal 304 is received from a CPU, restreaming arbiter state machine 214 sends a SPI arbitration grant signal 306 at state 504 back to the CPU based at least in part on a port identifier of the requesting source agent coupled to the CPU (e.g., a companion die such as an EC). When the system is in a system initialization mode, steps 502 and 504 are not used, since there is no need to perform the arbitration. This is shown in box 501. In either case (either system initialization mode or not) restreaming arbiter state machine 214 is in wait state 506, while waiting to receive a SPI read request signal from the CPU. When a SPI read request signal 312 is received, restreaming arbiter state machine 214 sends a read request 314 to memory 164 for a selected chunk of data from the memory. In an embodiment, the data chunk is a portion of EC FW 160 to be returned to a requesting EC. Restreaming arbiter state machine 214 then is in another wait state 510, while waiting for the read request to be completed by the memory. When the read request is completed, restreaming state arbiter machine 214 sends at state 512 a SPI read copy signal 318 to the CPU. When not in a system initialization mode, at state 514, restreaming arbiter state machine 214 sends a SPI arbitration release request 322 to the CPU. Processing for the restreaming arbiter state machine then returns to wait state 502. When in a system initialization mode, step 514 is not needed (as shown in box 501).

Embodiments of the present invention reduces the EC FW load time in an 8-CPU system to approximately 1.65 seconds, which can be overlapped/parallelized with the BIOS MRC initialization time of approximately 5 seconds. If a conventional serial protocol is used (without the u-architectural changes described herein), the load time is greater than 13 seconds. Thus, embodiments deliver decreased boot times. Future versions of cloud/networking servers are expected to support up to 32 or 64 CD sockets. Embodiments provide the necessary scaling capabilities for the next generation PCHs to support maximum parallelism in the legacy path, to minimize BOM costs by eliminating additional EPROMs and SPI flash memory and at the same time provide tangible benefits to the original equipment manufacturers (OEMs) and the end user from a performance, power, functional and cost standpoint. Reprogramming the OOB communication link bridge is manageable and does not take too many processor cycles; hence it can be easily scaled for a huge multi-node system with several CD instances in the system.

Figure 6:
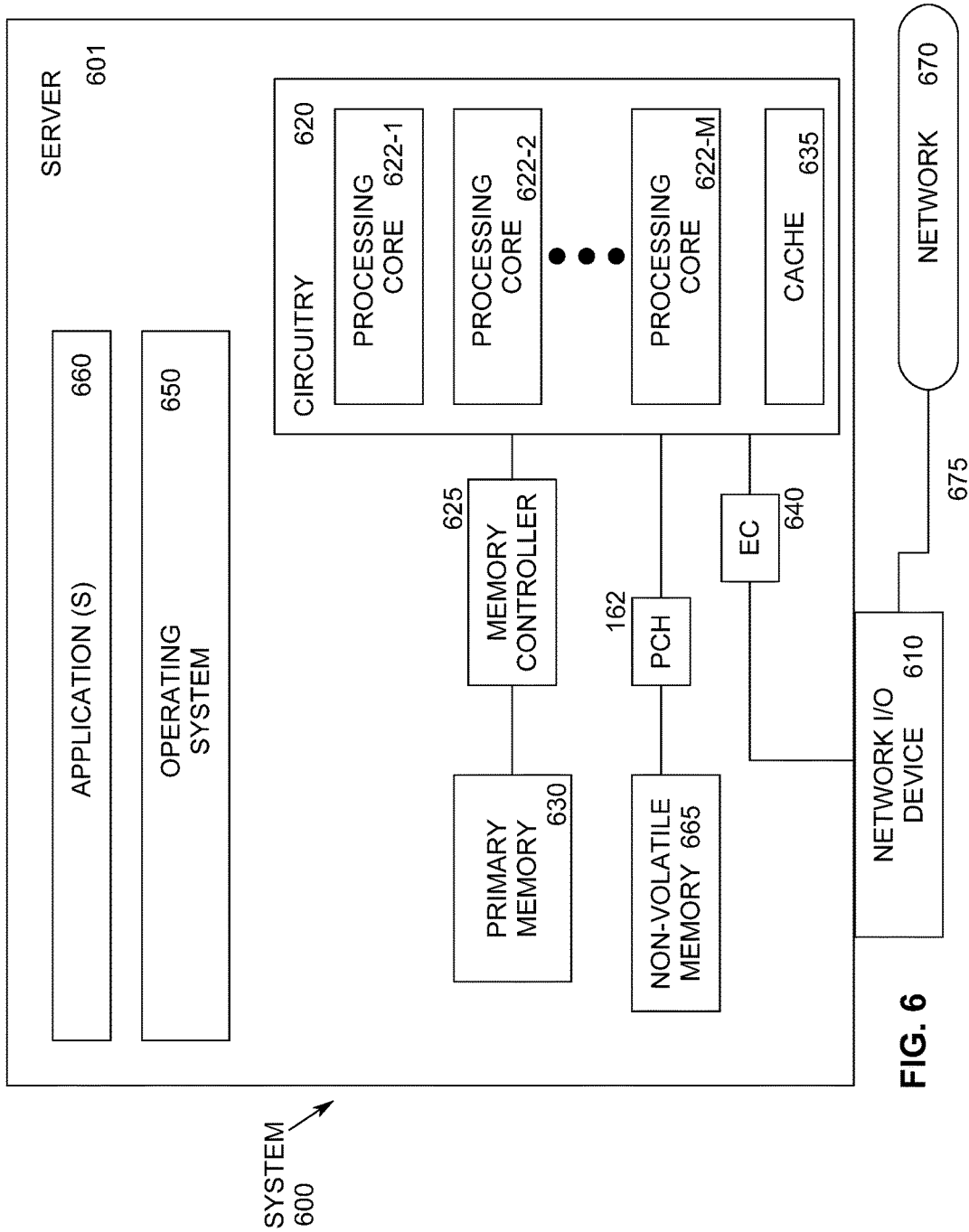
FIG. 6 illustrates an example of a computer server.

FIG. 6 illustrates an example computing system 600. As shown in FIG. 6, computing system 600 includes a computer server 601 coupled to a network 670. In some examples, as shown in FIG. 6, compute server 601 is coupled to network 670 (such as the Internet) via a network communication channel 675 and through at least one network I/O device 610 (e.g., a network interface controller (NIC)) having one or more ports connected or coupled to network communication channel 675.

According to some examples, compute server 601, as shown in FIG. 6, includes processor circuitry 620, primary memory 630 (which may be volatile), non-volatile memory (NVM) 665, memory controller 625, an operating system (OS) 650, one or more application(s) 660. In some examples, as shown in FIG. 6, circuitry 620 is communicatively coupled to primary memory 630 and via memory controller 625. In other examples, memory controller 625 may be integral with processor circuitry 620. Although not shown in FIG. 6, in some examples, operating system 650 and application(s) 660 are implemented, at least in part, via cooperation between one or more memory devices included in primary memory 630 (e.g., volatile or NVM devices), NVM 665 and elements of circuitry 620 such as processing cores 622-1 to 622-$m$, where "m" is any positive whole integer greater than 2.

In some examples, compute server 601, includes, but is not limited to, a server, a server array or server farm, a web server, a network server, an Internet server, a work station, a mini-computer, a main frame computer, a supercomputer, a network appliance, a web appliance, a distributed computing system, multiprocessor systems, processor-based systems, or a combination thereof. Also, circuitry 620 comprises one or more central processing units (CPUs) such as CPU 1 101, CPU 2 108, CPU 3 115, CPU 4 122, CPU 5 129, CPU 6 136, CPU 7 143, and CPU 8 150 of FIG. 1, each having one or more processing cores 622-1 to 622-$m$, each of which may include various commercially available processors, including without limitation Intel® Atom®, Celeron®, Core (2) Duo®, Core i3, Core i5, Core i7, Itanium®, Pentium®, Xeon® or Xeon Phi® processors; and similar processors. Circuitry 620 may include at least one cache 635 to store data.

According to some examples, primary memory 630 and/or NVM 665 is composed of one or more memory devices or dies which may include various types of volatile and/or non-volatile memory. Volatile types of memory include, but are not limited to, dynamic random-access memory (DRAM), static random-access memory (SRAM), thyristor RAM (TRAM) or zero-capacitor RAM (ZRAM). Non-volatile types of memory include byte or block addressable types of non-volatile memory having a 3-dimensional (3-D) cross-point memory structure that includes chalcogenide phase change material (e.g., chalcogenide glass) hereinafter referred to as "3-D cross-point memory" (such as 3D XPoint™ commercially available from Intel Corporation). Non-volatile types of memory also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In one example, primary memory 630 is a volatile memory and persistent memory 665 is a NVM. In one example, communication with NVM 665 is performed over a serial peripheral interface (SPI).

Server 601 includes a platform controller hub 162 as discussed above with reference to FIGS. 1-5. Processor circuitry 620 interfaces to at least one Ethernet controller 640, which communicates with network I/O device 610. In one embodiment there are as many Ethernet controllers as there are CPUs in processor circuitry 620. In another embodiment there are two Ethernet controllers per CPU as is shown in FIG. 1. In other embodiments, there may be any number of CPUs in the computer server, with each CPU being coupled to one or more Ethernet Controller. The common firmware image for the Ethernet controllers is stored in non-volatile memory 665, and during system initialization is retrieved from the non-volatile memory by circuitry 620 and stored in the Ethernet controller(s) 640 to provide the executable code for the Ethernet controller(s).

Various components of compute server 601 are communicatively coupled to each other by various types of communications media to coordinate operations. The coordination may involve the uni-directional or bi-directional exchange of information. For instance, the components communicate information in the form of signals communicated over the communications media. The information can be implemented as signals allocated to various signal lines. In such allocations, each message is a signal. Further embodiments, however, may alternatively employ data messages. Such data messages are sent across various connections. Example connections include parallel interfaces, serial interfaces, and bus interfaces.

It should be appreciated that the exemplary computing platforms shown in the Figures may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
a communications link bridge coupled to a plurality of processors to control connections between each of the plurality of processors and the apparatus, each processor including a plurality of companion dies, each companion die having a port identifier; and
a serial peripheral interface (SPI) controller coupled to a memory over a memory interface to control access to the memory, the SPI controller configured to, during system initialization, selectively bypass a token requirement for access to the memory for read requests by one or more of the plurality of processors and allow two or more of the plurality of processors to read the memory concurrently, the SPI controller including a state machine to grant access to the memory interface without requiring a token when the apparatus is in a system initialization mode and based at least in part on the port identifier of a selected companion die included in a selected one of the read requests.

2. The apparatus of claim 1, wherein a selected one or more of the read requests is to obtain a portion of a firmware image for the companion die.

3. The apparatus of claim 2, wherein each companion die of the plurality of companion dies comprises an Ethernet controller.

4. The apparatus of claim 3, wherein the memory comprises a flash memory and the memory interface comprises a serial peripheral interface (SPI).

5. The apparatus of claim 2, wherein the SPI controller is configured to allow restreaming of read requests from a plurality of source agents, the source agents comprising one or more of the plurality of processors and companion dies.

6. The apparatus of claim 2, wherein the communications link bridge is configured to allow independent unique assignment of port identifiers to companion dies during system initialization.

7. The apparatus of claim 1, comprising a communications link router coupled to the communications link bridge to route access to the memory by a selected one of the plurality of processors.

8. A system comprising:
a plurality of processors, each processor of the plurality of processors coupled to a plurality of companion dies, each one of the plurality of companion dies having a port identifier; and
a platform control hub coupled to the plurality of processors over a plurality of out-of-band (OOB) communications links and a plurality of interconnects, the platform control hub including
a communications link bridge coupled to the plurality of processors over the OOB communications links to control connections between each of the plurality of processors and the platform control hub; and
a serial peripheral interface (SPI) controller coupled to a memory over a memory interface to control access to the memory, the SPI controller configured to, during system initialization, selectively bypass a token requirement for access to the memory for read requests by one or more of the plurality of processors and allow two or more of the plurality of processors to read the memory concurrently, the SPI controller including a state machine to grant access to the memory interface without requiring a token when the system is in a system initialization mode and based at least in part on the port identifier of a selected companion die included in a selected one of the read requests.

9. The system of claim 8, wherein the selected one of the read requests is to obtain a portion of a firmware image for the selected companion die.

10. The system of claim 9, wherein each companion die of the plurality of companion dies comprises an Ethernet controller.

11. The system of claim 10, wherein the memory comprises a flash memory and the memory interface comprises a serial peripheral interface (SPI).

12. The system of claim 8, wherein the SPI controller is configured to allow restreaming of read requests from a plurality of source agents, the source agents comprising one or more of the plurality of processors and companion dies.

13. The system of claim 8, wherein the communications link bridge is configured to allow independent unique assignment of port identifiers to companion dies during system initialization.

14. The system of claim 8, wherein the platform control hub comprises a communications link router coupled to the communications link bridge to route access to the memory by a selected one of the plurality of processors.

15. In a system having a plurality of processors, a method comprising:
receiving a read request from a selected one of the plurality of processors to get data from a memory coupled to a memory interface;
sending a read request to the memory to get the data by selectively bypassing a token requirement for access to the memory for read requests by one or more of the plurality of processors when the system is in a system initialization mode and based at least in part on a port identifier of a source agent coupled to the selected one of the plurality of processors;
receiving the data from the memory;
sending the data to the selected one of the plurality of processors; and
sending a release arbitration signal to the selected one of the plurality of processors.

16. The method of claim 15, wherein the read request is to obtain a portion of a firmware image for the source agent, the source agent comprising a companion die.

17. The method of claim 16, wherein the companion die comprises an Ethernet controller.

18. The method of claim 17, wherein the memory comprises a flash memory and the memory interface comprises a serial peripheral interface (SPI).

* * * * *